(12) United States Patent
Blunier et al.

(10) Patent No.: US 9,003,984 B2
(45) Date of Patent: Apr. 14, 2015

(54) STORAGE TANK MOUNTING ARRANGEMENT FOR AN AGRICULTURAL IMPLEMENT

(75) Inventors: Timothy R. Blunier, Danvers, IL (US); Brian McMahon, Deer Creek, IL (US)

(73) Assignee: CNH Industrial America LLC, New Holland, PA (US)

( * ) Notice: Subject to any disclaimer, the term of this patent is extended or adjusted under 35 U.S.C. 154(b) by 143 days.

(21) Appl. No.: 13/604,757

(22) Filed: Sep. 6, 2012

(65) Prior Publication Data
US 2014/0060402 A1 Mar. 6, 2014

(51) Int. Cl.
| A01C 23/00 | (2006.01) |
| A01B 59/048 | (2006.01) |
| B60P 3/22 | (2006.01) |

(52) U.S. Cl.
CPC ............. *A01B 59/048* (2013.01); *A01C 23/008* (2013.01); *B60P 3/2215* (2013.01)

(58) Field of Classification Search
USPC ................. 239/653, 172; 220/745, 315, 4.12, 220/562–564; 280/830, 833, 834, 831, 280/836–838, 839; 111/118
See application file for complete search history.

(56) References Cited

U.S. PATENT DOCUMENTS

| 1,472,078 | A | * | 10/1923 | Lucius ........................... 280/838 |
| 3,033,301 | A | | 5/1962 | Blue et al. |
| 3,488,061 | A | | 1/1970 | Hansen et al. |
| 3,578,348 | A | | 5/1971 | Reinke |
| 3,650,501 | A | | 3/1972 | Streb |
| 3,698,730 | A | | 10/1972 | Hansen |
| 3,860,252 | A | | 1/1975 | Martens et al. |
| 4,162,796 | A | | 7/1979 | Mead |
| 4,325,560 | A | | 4/1982 | Hirvonen |
| 4,434,991 | A | | 3/1984 | Winterton |
| 5,475,972 | A | | 12/1995 | McConnell et al. |
| 5,484,336 | A | | 1/1996 | McConnell |
| 5,582,311 | A | | 12/1996 | Bartenstein et al. |
| 6,637,706 | B2 | | 10/2003 | Kim et al. |
| 7,585,000 | B1 | | 9/2009 | Hoek |
| 7,984,925 | B2 | | 7/2011 | Levin et al. |
| 2006/0006635 | A1 | | 1/2006 | Sonderegger |
| 2009/0223975 | A1 | | 9/2009 | McCallister |
| 2012/0000678 | A1 | | 1/2012 | McCoige |

FOREIGN PATENT DOCUMENTS

JP            10067214       3/1998

OTHER PUBLICATIONS http://jbienterprises.com/allsteer.htm dated Aug. 16, 2012.

* cited by examiner

*Primary Examiner* — Christopher J Novosad
(74) *Attorney, Agent, or Firm* — Rebecca L. Henkel

(57) ABSTRACT

An agricultural implement includes a frame assembly configured to support a storage tank. The frame assembly includes a pair of longitudinal beams positioned on opposite lateral sides of the storage tank, and multiple cross members extending between the pair of longitudinal beams. A substantially flat upper surface of each cross member is secured to a lower surface of each longitudinal beam, and each cross member is configured to support the storage tank via contact between the substantially flat upper surface of the cross member and a substantially flat lower surface of the storage tank such that the substantially flat lower surface of the storage tank is positioned vertically below an upper surface of each longitudinal beam.

13 Claims, 5 Drawing Sheets

STORAGE TANK MOUNTING ARRANGEMENT FOR AN AGRICULTURAL IMPLEMENT

BACKGROUND

The invention relates generally to ground working equipment, such as agricultural equipment, and more specifically, to a storage tank mounting arrangement for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

Certain fertilizer application implements include a storage tank configured to hold liquid fertilizer, and to provide the liquid fertilizer to the injection nozzles or the knives. The storage tank is supported by a frame assembly, which may also support a tool bar assembly having the openers, knives, and/or injection nozzles (e.g., as elements of respective row units mounted to the tool bar assembly). For example, the frame assembly may include a structural framework and curved support members mounted to a flat top surface of the structural framework. The curved support members are configured to support a cylindrical storage tank (e.g., a storage tank having a circular or elliptical cross-section) on the flat top surface of the frame assembly. Unfortunately, because the storage tank is mounted above the structural framework, the center of gravity of the implement may be higher than desired, thereby reducing the stability of the implement. In addition, employing curved support members for the cylindrical storage tank may increase the cost and complexity of the implement.

BRIEF DESCRIPTION

In one embodiment, an agricultural implement includes a frame assembly configured to support a storage tank. The frame assembly includes a pair of longitudinal beams positioned on opposite lateral sides of the storage tank, and multiple cross members extending between the pair of longitudinal beams. A substantially flat upper surface of each cross member is secured to a lower surface of each longitudinal beam, and each cross member is configured to support the storage tank via contact between the substantially flat upper surface of the cross member and a substantially flat lower surface of the storage tank such that the substantially flat lower surface of the storage tank is positioned vertically below an upper surface of each longitudinal beam.

In another embodiment, an agricultural implement includes a storage tank configured to hold flowable agricultural product, and a frame assembly configured to support the storage tank. The frame assembly includes a first longitudinal beam positioned outwardly from a first lateral side of the storage tank, and a second longitudinal beam positioned outwardly from a second lateral side of the storage tank, opposite the first lateral side. The frame assembly also includes multiple cross members extending substantially perpendicularly between the first longitudinal beam and the second longitudinal beam. A substantially flat upper surface of each cross member is secured to a lower surface of each longitudinal beam, and each cross member is configured to support the storage tank via contact between the substantially flat upper surface of the cross member and a substantially flat lower surface of the storage tank such that the substantially flat lower surface of the storage tank is positioned vertically below an upper surface of each longitudinal beam.

In a further embodiment, an agricultural implement includes a tool bar assembly, and multiple row units coupled to the tool bar assembly, and configured to deliver flowable agricultural product to a field. The agricultural implement also includes a storage tank configured to hold the flowable agricultural product, and to provide the flowable agricultural product to the row units. In addition, the agricultural implement includes a frame assembly coupled to the tool bar assembly, and configured to support the storage tank. The frame assembly includes a pair of longitudinal beams positioned on opposite lateral sides of the storage tank, and multiple cross members extending between the pair of longitudinal beams. A substantially flat upper surface of each cross member is secured to a lower surface of each longitudinal beam, and each cross member is configured to support the storage tank via contact between the substantially flat upper surface of the cross member and a substantially flat lower surface of the storage tank such that the substantially flat lower surface of the storage tank is positioned vertically below an upper surface of each longitudinal beam.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
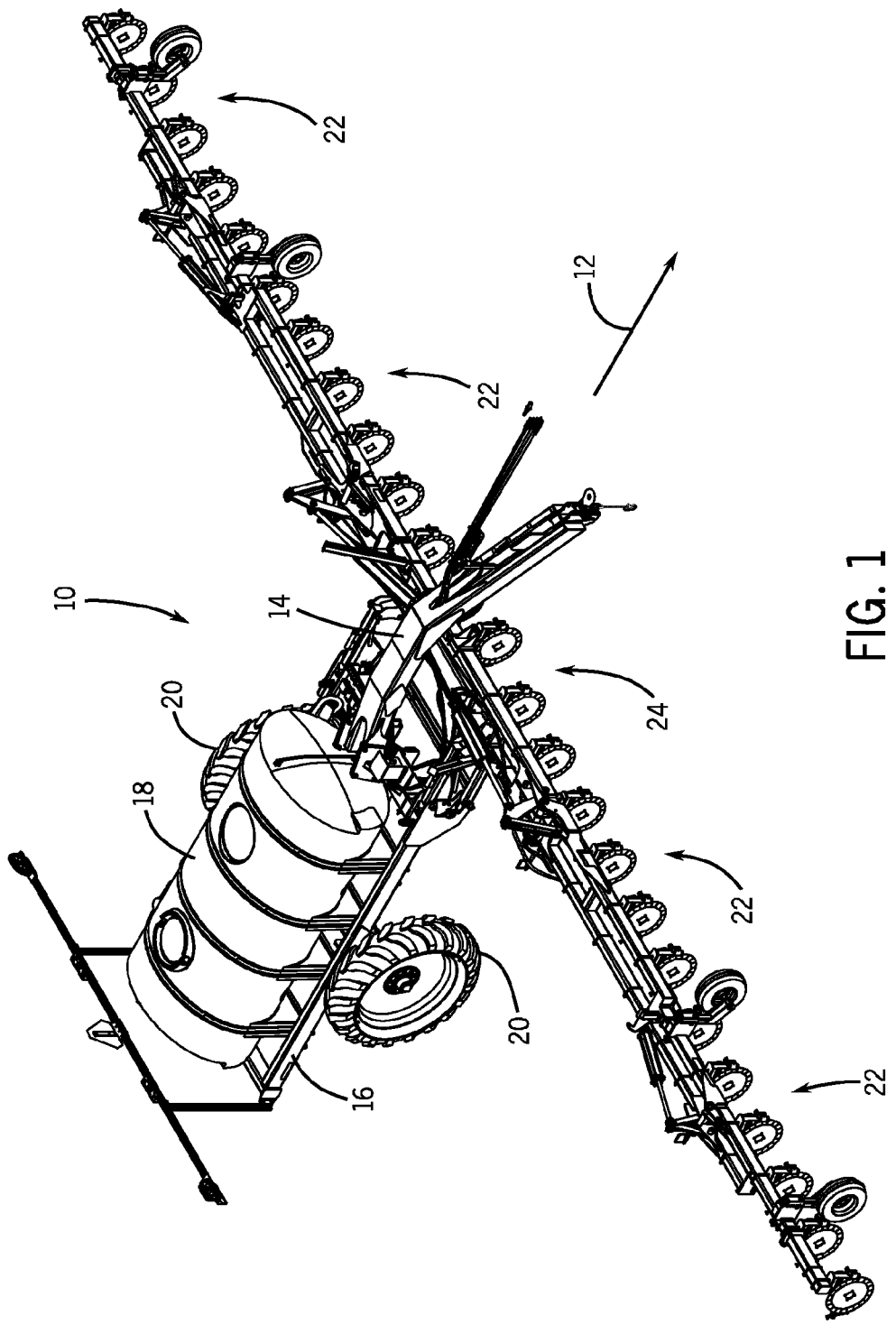
FIG. 1 is a perspective view of an embodiment of an agricultural implement having a frame assembly configured to support a storage tank between longitudinal beams.

FIG. 1 is a perspective view of an embodiment of an agricultural implement 10 having a frame assembly configured to support a storage tank between longitudinal beams. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame assembly 16 of the implement 10 to facilitate towing of the implement 10 in the direction of travel 12. In the illustrated embodiment, the frame assembly 16 supports a storage tank 18 configured to house a flowable agricultural product, such as liquid fertilizer.

A pair of wheels 20 coupled to the frame assembly 16 is configured to support the weight of the frame assembly 16, the storage tank 18, and the flowable agricultural product, thereby enabling the implement 10 to be towed across the filed.

The implement 10 is configured to transfer the flowable agricultural product from the storage tank 18 to multiple row units 22 of a tool bar assembly 24. Each row unit 22 includes a ground engaging tool configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool. In certain embodiments, the penetration depth of the ground engaging tools is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows), thereby facilitating enhanced crop development. In addition, the implement 10 may be utilized to apply fertilizer to previously planted seeds (e.g., via injecting fertilizer between rows of the previously planted seeds).

As discussed in detail below, the frame assembly 16 is configured to support the storage tank 18 between longitudinal beams of the frame assembly 16, thereby reducing the center of gravity and increasing the stability of the implement 10. In certain embodiments, the frame assembly includes a pair of longitudinal beams positioned on opposite lateral sides of the storage tank. The frame assembly also includes multiple cross members extending between the pair of longitudinal beams. A substantially flat upper surface of each cross member is secured to a lower surface of each longitudinal beam, and each cross member is configured to support the storage tank via contact between the substantially flat upper surface of the cross member and a substantially flat lower surface of the storage tank. In this configuration, the substantially flat lower surface of the storage tank is positioned vertically below an upper surface of each longitudinal beam, thereby providing an implement having a lower center of gravity than an implement in which the storage tank is mounted above the longitudinal beams. In addition, because the lower surface of the storage tank is substantially flat, curved support members, which may be utilized to support a substantially cylindrical tank (e.g., a tank having a substantially circular or a substantially elliptical cross-section), are obviated, thereby reducing the cost and complexity of the implement.

Figure 2:
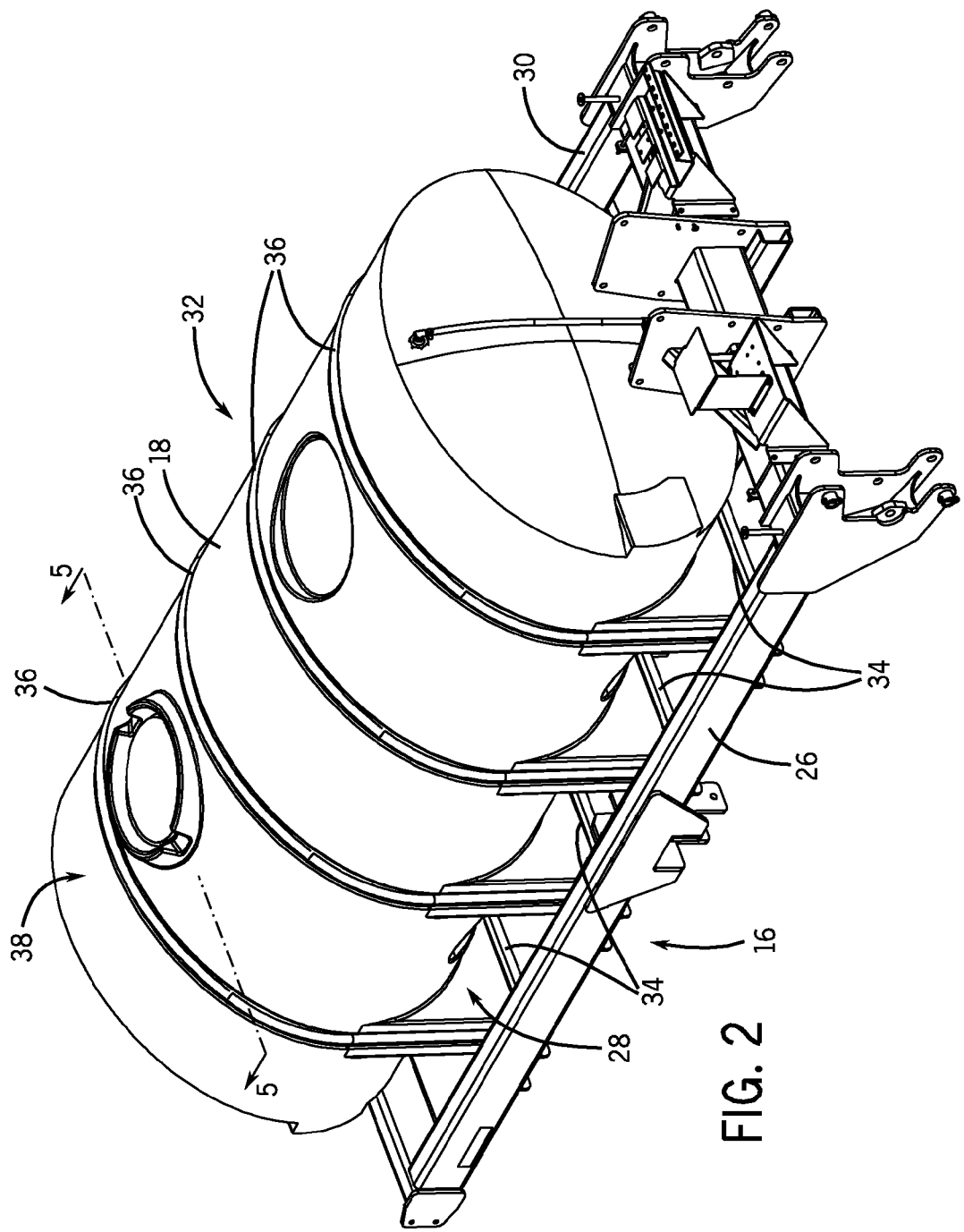
FIG. 2 is a perspective view of an embodiment of a frame assembly and storage tank that may be used within the agricultural implement of FIG. 1.

FIG. 2 is a perspective view of an embodiment of a frame assembly 16 and storage tank 18 that may be used within the agricultural implement of FIG. 1. As previously discussed, the frame assembly 16 supports a storage tank 18 configured to house a flowable agricultural product, such as liquid fertilizer. The frame assembly 16 includes a first longitudinal beam 26 positioned outwardly from a first lateral side 28 of the tank 18, and a second longitudinal beam 30 positioned outwardly from a second lateral side 32 of the tank 18. Accordingly, the longitudinal beams 26 and 30 are positioned on opposite lateral sides of the storage tank 18. The frame assembly 16 also includes multiple cross members 34 extending between the first longitudinal beam 26 and the second longitudinal beam 30. As discussed in detail below, each cross member 34 is configured to support the storage tank via contact between a substantially flat upper surface of the cross member and a substantially flat lower surface of the storage tank.

In the illustrated embodiment, the storage tank 18 is secured to the cross members by multiple mounting straps 36. As discussed in detail below, each mounting strap 36 includes a first end secured to a respective cross member 34, a second end secured to the respective cross member, and a body that extends around an upper portion 38 of the storage tank 28 from the first end to the second end. In certain embodiments, the first end and the second end of each mounting strap 36 are secured to the substantially flat upper surface of the respective cross member by a fastener. In such embodiments, the storage tank 18 may be removed from the frame assembly 16 by uncoupling the fasteners and the respective mounting straps 36, thereby enabling the storage tank to be interchanged with another storage tank of a different configuration (e.g., larger capacity, smaller capacity, additional internal compartments, etc.).

As discussed in detail below, the substantially flat upper surface of each cross member 34 is secured to a lower surface of each longitudinal beam. As a result, the substantially flat lower surface of the storage tank is positioned vertically below an upper surface of each longitudinal beam, thereby providing an implement having a lower center of gravity than an implement in which the storage tank is mounted above the longitudinal beams. In addition, because the lower surface of the storage tank is substantially flat, curved support members, which may be utilized to support a substantially cylindrical tank (e.g., a tank having a substantially circular or a substantially elliptical cross-section), are obviated, thereby reducing the cost and complexity of the implement.

Figure 3:
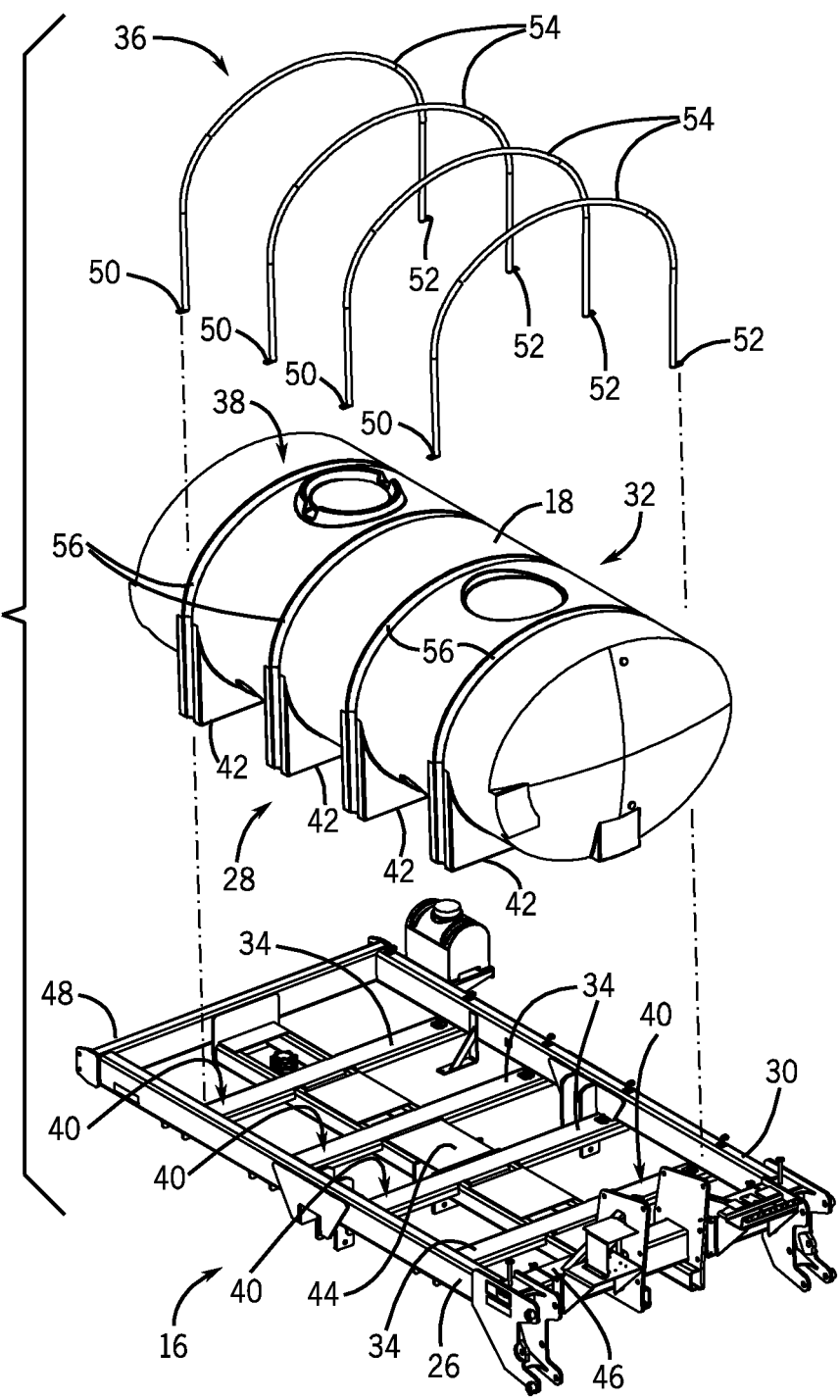
FIG. 3 is an exploded perspective view of the frame assembly and storage tank of FIG. 2.

FIG. 3 is an exploded perspective view of the frame assembly 16 and storage tank 18 of FIG. 2. As illustrated, each cross member 34 includes a substantially flat upper surface 40 secured to a lower surface of each longitudinal beam 26 and 30. In addition, each cross member 34 is configured to support the storage tank 18 via contact between the substantially flat upper surface 40 of the cross member 34 and a corresponding substantially flat lower surface 42 of the storage tank 18. Because the cross members 34 are secured to the lower surface of each longitudinal beam 26 and 30, the substantially flat lower surface 42 of the storage tank 18 is positioned vertically below an upper surface of each longitudinal beam. Accordingly, a center of gravity of the implement may be lower than an implement having a storage tank mounted above the longitudinal beams. While each cross member 34 is oriented substantially perpendicular to the longitudinal beams 26 and 30 in the illustrated embodiment, it should be appreciated that alternative embodiments may employ cross members angled relative to the longitudinal beams.

In the illustrated embodiment, the frame assembly 16 includes a central longitudinal support assembly 44 coupled to a lower surface of each cross member 34. The central longitudinal support assembly 44 is configured to provide additional support to the cross members 34, thereby enhancing the strength of the frame assembly 16. As illustrated, the central longitudinal support assembly 44 extends from a first lateral beam 46 (e.g., positioned forward of the storage tank 18 along the direction of travel) to a second lateral beam 48 (e.g., positioned rearward of the storage tank 18 along the direction of travel). The first and second lateral beams 46 and 48, in turn, are coupled (e.g., via respective welded connections) to the first and second longitudinal beams 26 and 30, thereby forming a box structure, which further enhances the strength of the frame assembly 16.

As previously discussed, mounting straps 36 are employed to secure the storage tank 18 to the cross members 34. As illustrated, each mounting strap 36 includes a first end 50 configured to be secured to a respective cross member 34, and a second end 52 configured to be secured to the respective cross member 34. Each mounting strap 36 also includes a body 54 configured to extend around the upper portion 38 of the storage tank 18 from the first end 50 to the second end 52. In the illustrated embodiment, the storage tank 18 includes recesses 56 configured to accommodate the mounting straps 36, and to block movement of the mounting straps 36 while the tank 18 is coupled to the frame assembly 16.

To secure the storage tank 18 to the frame assembly 16, the substantially flat lower surfaces 42 of the storage tank 18 are placed into contact with the substantially flat upper surfaces 40 of the cross members 34. The mounting straps 36 are then disposed around the upper portion 38 of the storage tank 18 (e.g., placed within the recesses 56), and the first and second ends 50 and 52 of each mounting strap 36 are secured to a respective cross member 34. While the illustrated embodiment includes four cross members 34 and four mounting straps 36 to secure the storage tank 18 to the frame assembly 16, it should be appreciated that more or fewer cross members 34 and mounting straps 36 may be utilized in other embodiments. For example, certain embodiments may include 1, 2, 3, 4, 5, 6, or more cross members 34 and a corresponding number of mounting straps 36. In further embodiments, the storage tank 18 may be secured to the cross members 34 via alternative connectors, such as brackets, clamps, and/or fasteners, for example.

Figure 4:
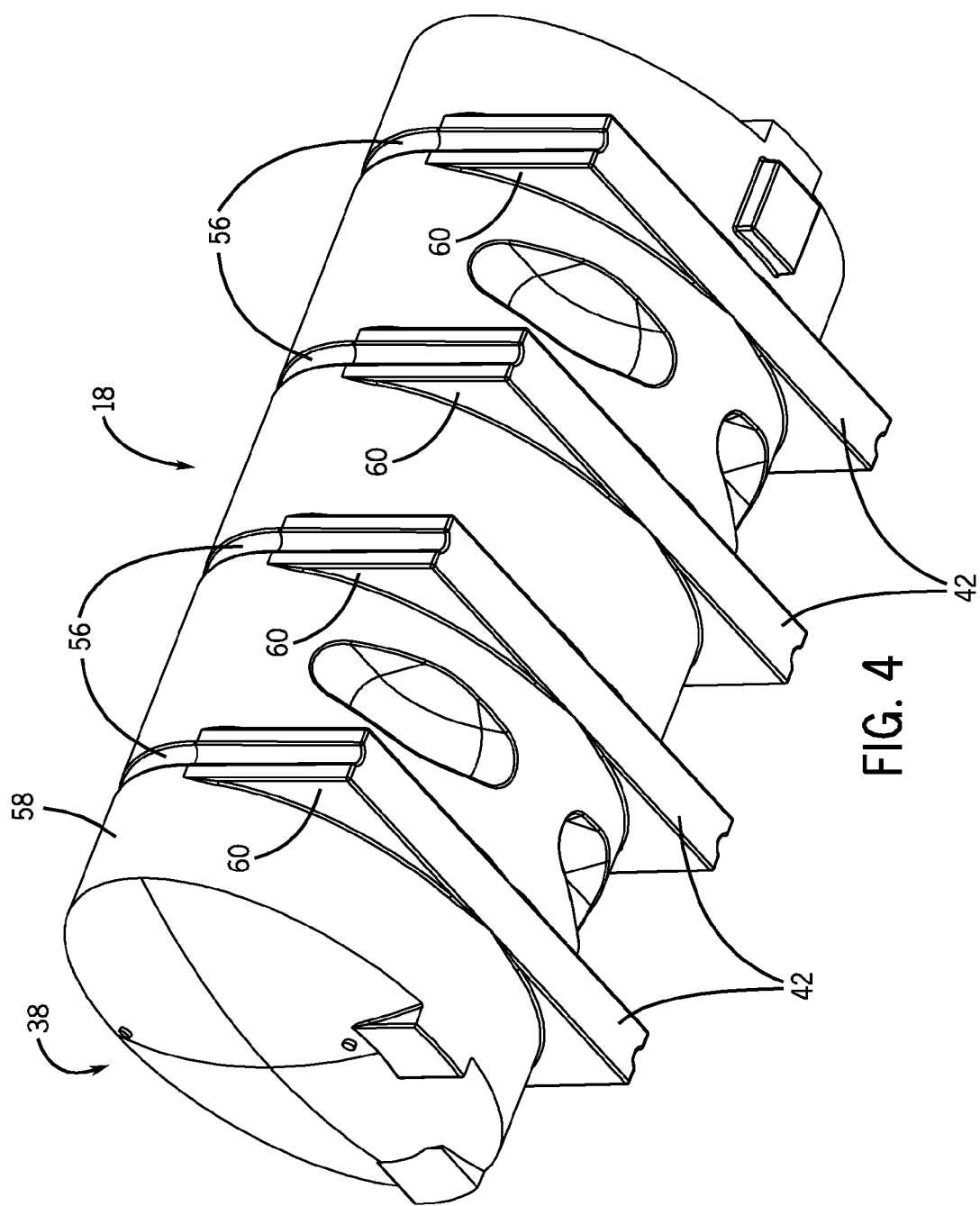
FIG. 4 is a bottom perspective view of the storage tank of FIG. 2.

FIG. 4 is a bottom perspective view of the storage tank 18 of FIG. 2. As illustrated, the storage tank 18 includes a cylindrical body 58 (e.g., a body having a substantially circular or a substantially elliptical cross-section), and multiple rectangular extensions 60 extending from a lower portion of the body 58. In the illustrated embodiment, the cylindrical body 58 and the rectangular extensions 60 form a continuous storage volume within the tank 18, thereby providing more storage capacity than a substantially cylindrical tank. The rectangular extensions 60 also form the substantially flat lower surfaces 42 of the storage tank 18. As previously discussed, each substantially flat lower surface 42 is configured to contact a substantially flat upper surface of a respective cross member, thereby enabling the cross member to support the storage tank 18. In addition, each recess 56 extends along opposite lateral sides of each rectangular extension 60 to facilitate passage of the mounting straps 36 along the lateral sides of the tank 18. Because the lower surfaces 42 of the storage tank 18 are substantially flat, curved support members, which may be utilized to support a substantially cylindrical tank (e.g., a tank having a substantially circular or a substantially elliptical cross-section), are obviated, thereby reducing the cost and complexity of the implement.

Figure 5:
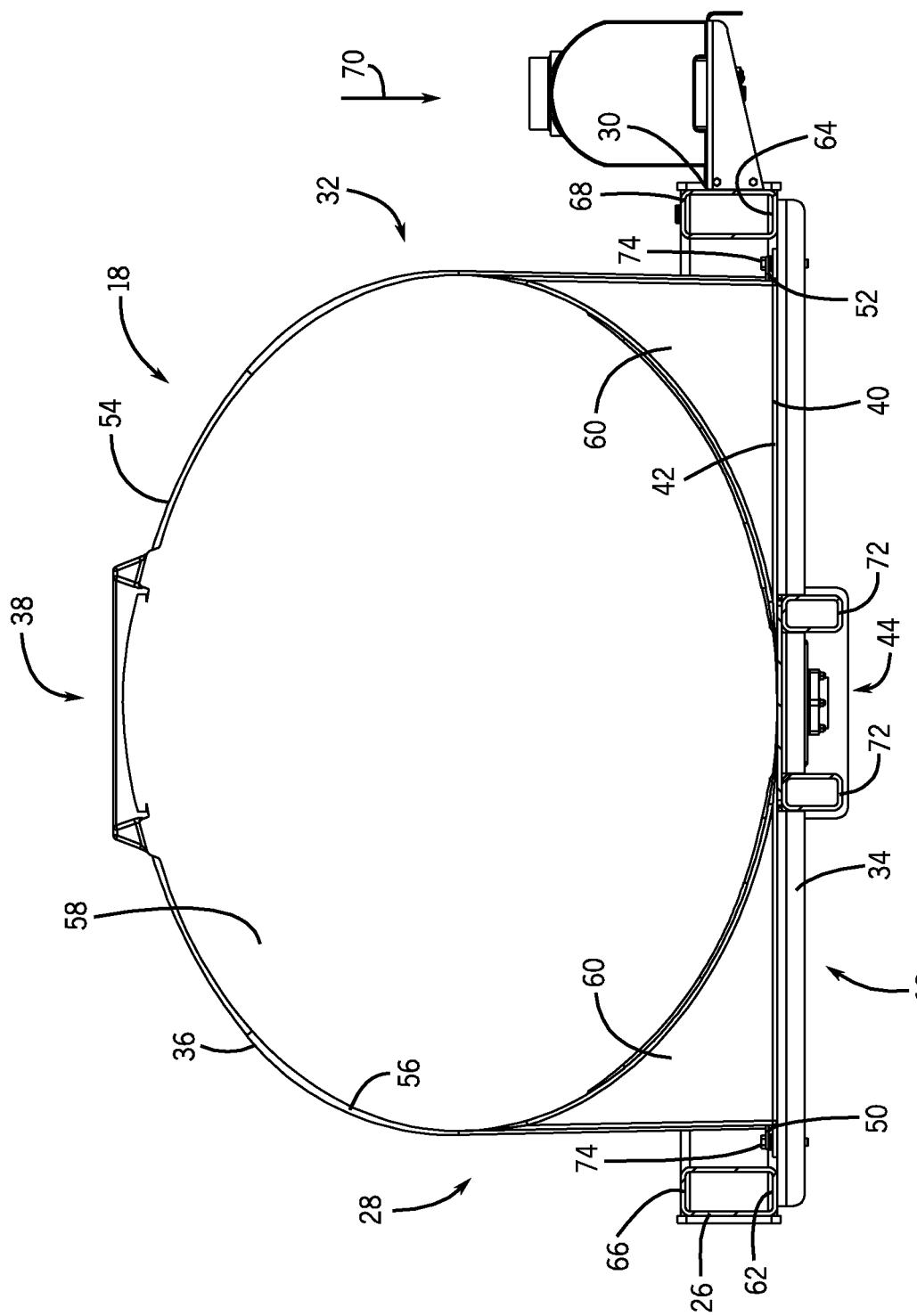
FIG. 5 is a cross-sectional view of the frame assembly and storage tank of FIG. 2, taken along line 5-5.

FIG. 5 is a cross-sectional view of the frame assembly 16 and storage tank 18 of FIG. 2, taken along line 5-5. As illustrated, the first longitudinal beam 26 is positioned outwardly from the first lateral side 28 of the storage tank 18, and the second longitudinal beam 30 is positioned outwardly from the second lateral side 32 of the storage tank 18. In addition, a cross member 34 extends between the first longitudinal beam 26 and the second longitudinal beam 30. In the illustrated embodiment, the substantially flat upper surface 40 of the cross member 34 is directly coupled to a lower surface 62 of the first longitudinal beam 26, and directly coupled to a lower surface 64 of the second longitudinal beam 30. For example, the upper surface 40 of the cross member 34 may be coupled to the lower surface 62 of the first longitudinal beam 26 and/or coupled to the lower surface 64 of the second longitudinal beam 30 by a welded connection.

Furthermore, the cross member 34 is configured to support the storage tank 18 via contact between the substantially flat upper surface 40 of the cross member 34 and the substantially flat lower surface 42 of the storage tank 18. In this configuration, the substantially flat lower surface 42 of the storage tank 18 is positioned below an upper surface 66 of the first longitudinal beam 26 along a vertical direction 70. The substantially flat lower surface 42 of the storage tank 18 is also positioned below an upper surface 68 of the second longitudinal beam 30 along the vertical direction 70. In the illustrated embodiment, the substantially flat lower surface 42 of the storage tank 18 is substantially vertically level with the lower surfaces 62 and 64 of the longitudinal beams 26 and 30. As a result of this configuration, a center of gravity of the implement may be lower than an implement having a storage tank mounted above the longitudinal beams.

In the illustrated embodiment, the frame assembly 16 includes a central longitudinal support assembly 44 coupled to the lower surface of the cross member 34. The central longitudinal support assembly 44 is configured to provide additional support to the cross member 34, thereby enhancing the strength of the frame assembly 16. In the illustrated embodiment, the longitudinal support assembly 44 includes two longitudinal beams 72. However, it should be appreciated that the central longitudinal support assembly 44 may include more or fewer longitudinal beams in alternative embodiments. For example, in certain embodiment, the central longitudinal support assembly 44 may include 1, 2, 3, 4, 5, 6, or more longitudinal beams. In further embodiments, the central longitudinal support assembly 44 may be omitted (e.g., in configurations employing a smaller capacity storage tank).

Furthermore, the mounting strap 36 extends around the upper portion 38 of the storage tank 18 to secure the storage tank 18 to the cross member 34. As illustrated, the first end 50 of the mounting strap 36 is secured to the substantially flat upper surface 40 of the cross member 34 via a first fastener 74 (such as the illustrated bolt). In addition, the second end 52 of the mounting strap 36 is secured to the substantially flat upper surface 40 of the cross member 34 via a second fastener 74. With the fasteners secured, contact between the body 54 of the mounting strap 36 and the upper portion 38 of the storage tank 18 secures the storage tank 18 to the frame assembly 16. Because the lower surface 42 of the storage tank 18 is substantially flat, curved support members, which may be utilized to support a substantially cylindrical tank (e.g., a tank having a substantially circular or a substantially elliptical cross-section), are obviated, thereby reducing the cost and complexity of the implement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
a frame assembly configured to support a storage tank, wherein the frame assembly comprises a pair of longitudinal beams positioned on opposite lateral sides of the storage tank, and a plurality of cross members extending between the pair of longitudinal beams, wherein each cross member includes a continuous substantially flat upper surface, the continuous substantially flat upper surface of each cross member is directly coupled to a lower surface of each longitudinal beam, and each cross member is configured to support the storage tank via contact between the continuous substantially flat upper surface of the cross member and a substantially flat lower surface of the storage tank such that the substantially flat lower surface of the storage tank is positioned vertically below an upper surface of each longitudinal beam.

2. The agricultural implement of claim 1, wherein the continuous substantially flat upper surface of each cross member is directly coupled to the lower surface of each longitudinal beam by a welded connection.

3. The agricultural implement of claim 1, wherein each cross member is oriented substantially perpendicular to the pair of longitudinal beams.

4. The agricultural implement of claim 1, wherein the plurality of cross members is configured to position the substantially flat lower surface of the storage tank substantially vertically level with the lower surface of each longitudinal beam.

5. The agricultural implement of claim 1, comprising a plurality of mounting straps configured to secure the storage tank to the plurality of cross members, wherein each mounting strap includes a first end secured to a respective cross member, a second end secured to the respective cross member, and a body that extends around an upper portion of the storage tank from the first end to the second end.

6. The agricultural implement of claim 5, wherein the first end and the second end of each mounting strap are secured to the continuous substantially flat upper surface of the respective cross member.

7. The agricultural implement of claim 1, wherein the storage tank comprises a plurality of substantially flat lower surfaces, and each substantially flat lower surface is configured to align with a respective cross member.

8. The agricultural implement of claim 1, comprising a central longitudinal support assembly coupled to a lower surface of each cross member, and configured to support the plurality of cross members.

9. The agricultural implement of claim 1, wherein the storage tank is configured to hold flowable agricultural product, and to provide the flowable agricultural product to a plurality of row units.

10. An agricultural implement, comprising:
a storage tank configured to hold flowable agricultural product;
a frame assembly configured to support the storage tank, wherein the frame assembly comprises:
a first longitudinal beam positioned outwardly from a first lateral side of the storage tank;
a second longitudinal beam positioned outwardly from a second lateral side of the storage tank, opposite the first lateral side; and
a plurality of cross members extending substantially perpendicularly between the first longitudinal beam and the second longitudinal beam, wherein each cross member includes a continuous substantially flat upper surface, the continuous substantially flat upper surface of each cross member is directly coupled to a lower surface of each longitudinal beam, and each cross member is configured to support the storage tank via contact between the continuous substantially flat upper surface of the cross member and a substantially flat lower surface of the storage tank such that the substantially flat lower surface of the storage tank is positioned vertically below an upper surface of each longitudinal beam.

11. The agricultural implement of claim 10, wherein the plurality of cross members is configured to position the substantially flat lower surface of the storage tank substantially vertically level with the lower surface of each longitudinal beam.

12. The agricultural implement of claim 10, comprising a plurality of mounting straps configured to secure the storage tank to the plurality of cross members, wherein each mounting strap includes a first end secured to a respective cross member, a second end secured to the respective cross member, and a body that extends around an upper portion of the storage tank from the first end to the second end.

13. The agricultural implement of claim 10, comprising a central longitudinal support assembly coupled to a lower surface of each cross member, and configured to support the plurality of cross members.

* * * * *